(12) United States Patent
Jung et al.

(10) Patent No.: US 11,529,790 B2
(45) Date of Patent: Dec. 20, 2022

(54) JOINT BODY OF DIFFERENT MATERIALS AND METHOD FOR MANUFACTURING THE SAME

(71) Applicant: LG CHEM, LTD., Seoul (KR)

(72) Inventors: Jin Mi Jung, Daejeon (KR); Yu Jin Jeong, Daejeon (KR); Bu Gon Shin, Daejeon (KR); Tae Hwan Roh, Daejeon (KR); Sung Gon Kim, Daejeon (KR); Jung Jin Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 754 days.

(21) Appl. No.: 16/337,829

(22) PCT Filed: Sep. 27, 2017

(86) PCT No.: PCT/KR2017/010677
§ 371 (c)(1),
(2) Date: Mar. 28, 2019

(87) PCT Pub. No.: WO2018/062828
PCT Pub. Date: Apr. 5, 2018

(65) Prior Publication Data
US 2020/0262173 A1  Aug. 20, 2020

(30) Foreign Application Priority Data

Sep. 30, 2016 (KR) .................... 10-2016-0127021
Nov. 4, 2016 (KR) .................... 10-2016-0146953

(51) Int. Cl.
*B32B 15/08* (2006.01)
*C23F 1/00* (2006.01)
(Continued)

(52) U.S. Cl.
CPC ............ *B32B 3/30* (2013.01); *B23K 26/0622* (2015.10); *B23K 26/08* (2013.01); *B23K 26/20* (2013.01);
(Continued)

(58) Field of Classification Search
CPC ......... B32B 3/30; B32B 15/085; B32B 15/20; B32B 27/32; Y10T 428/24545
See application file for complete search history.

(56) References Cited

U.S. PATENT DOCUMENTS

2011/0111214 A1*  5/2011  Endo ................ B29C 45/14311
428/336

FOREIGN PATENT DOCUMENTS

JP    2010076437 A    4/2010
JP    2013-173248 A   9/2013
(Continued)

OTHER PUBLICATIONS

[NPL-1] Ikeda et al. (JP 2014-065288 A); Apr. 17, 2014 (EPO Machine Translation). (Year: 2014).*

*Primary Examiner* — Frank J Vineis
*Assistant Examiner* — Donald M Flores, Jr.
(74) *Attorney, Agent, or Firm* — Dentons US LLP

(57) ABSTRACT

The present specification relates to a joint body of different materials, and a method of manufacturing the same. The joint body includes a metal layer; and a resin layer provided on and in contact with one surface of the metal layer. The metal layer comprises two or more etching grooves and two or more burrs provided on a surface of the metal layer adjacent to the etching grooves.

12 Claims, 5 Drawing Sheets

(51) Int. Cl.
  *C23F 1/20*     (2006.01)
  *B32B 3/30*     (2006.01)
  *B23K 26/0622*  (2014.01)
  *B23K 26/364*   (2014.01)
  *B23K 26/53*    (2014.01)
  *B23K 26/57*    (2014.01)
  *B23K 26/08*    (2014.01)
  *B23K 26/20*    (2014.01)
  *B32B 15/085*   (2006.01)
  *B32B 15/20*    (2006.01)
  *B32B 27/32*    (2006.01)
  *B32B 37/04*    (2006.01)
  *B23K 103/16*   (2006.01)
  *B29C 45/14*    (2006.01)
  *B29K 101/12*   (2006.01)
  *B29K 705/00*   (2006.01)

(52) U.S. Cl.
  CPC ............ *B23K 26/364* (2015.10); *B23K 26/53* (2015.10); *B23K 26/57* (2015.10); *B32B 15/085* (2013.01); *B32B 15/20* (2013.01); *B32B 27/32* (2013.01); *B32B 37/04* (2013.01); *B23K 2103/172* (2018.08); *B29C 45/14336* (2013.01); *B29K 2101/12* (2013.01); *B29K 2705/00* (2013.01); *B32B 2310/0843* (2013.01); *Y10T 428/24545* (2015.01)

(56) References Cited

FOREIGN PATENT DOCUMENTS

| | | | |
|---|---|---|---|
| JP | 5292828 | B2 | 9/2013 |
| JP | 2014004801 | A | 1/2014 |
| JP | 2014-65288 | A | 4/2014 |
| JP | 2014065288 | A * | 4/2014 |
| JP | 2014117724 | A | 6/2014 |
| JP | 2014-166693 | A | 9/2014 |
| JP | 2015016596 | A | 1/2015 |
| JP | 2015116684 | A | 6/2015 |
| JP | 2016-43561 | A | 4/2016 |
| JP | 2016132131 | A | 7/2016 |
| JP | 2016-165746 | A | 9/2016 |
| JP | 2016159578 | A | 9/2016 |
| KR | 1020130018555 | A | 2/2013 |
| KR | 1020140090931 | A | 7/2014 |
| KR | 101499665 | B | 3/2015 |
| KR | 1020150064567 | A | 6/2015 |
| KR | 1020150092872 | A | 8/2015 |
| WO | 2009/151099 | A1 | 12/2009 |

* cited by examiner

JOINT BODY OF DIFFERENT MATERIALS AND METHOD FOR MANUFACTURING THE SAME

CROSS-REFERENCE TO RELATED APPLICATION(S)

This application is the national stage of international Application No. PCT/KR2017/010677 filed Sep. 27, 2017, which specification claims priority to, and the benefit of, Korean Patent Application Nos. 10-2016-0127021 and 10-2016-0146953 filed in the Korean Intellectual Property Office on Sep. 30, 2016 and Nov. 4, 2016, respectively, the entire contents of which are incorporated herein by reference.

TECHNICAL FIELD

This specification claims priority to and the benefit of Korean Patent Application Nos. 10-2016-0127021 and 10-2016-0146953 filed in the Korean Intellectual Property Office on Sep. 30, 2016 and Nov. 4, 2016, respectively, the entire contents of which are incorporated herein by reference.

The present invention relates to a joint body of different materials and a method of manufacturing the same.

BACKGROUND ART

In general, joining between different materials, such as a metal and a resin, is not easy in most cases because unique physical and chemical characteristics and surface states of the material are different from each other. A technology attempted to join the different materials may be generally classified into bonding by using an adhesive agent, mechanical tightening, welding, insert molding, and the like. Among them, the method using the adhesive agent or an adhesive film has an advantage in a simple usage method, so that the method is most widely used as a representative and classic method used for joining different materials in electronic products.

When the adhesive film is used, used is a principle in which the adhesive film is cut in accordance with a size to be positioned between metal and plastic, and then the adhesive film is pressed while applying heat and pressure by using a jig, and is cooled for a predetermined time, so that the adhesive agent is cured and bonding force is generated. Further, the mechanical tightening is performed by using a mechanical fastening tool, such as a screw or a rivet, and a process, such as a self-piercing rivet and clinching, which is slightly modified and applied from a general mechanical joining process is introduced for the effective different material joining. The process using the adhesive agent and the mechanical tightening process enables the different material joining with a relative easy access, but during the processes, another material is inserted between the different materials or a joint portion is exposed to the outside as it is, so that new technologies for joining new basic materials are recently suggested.

There are various technologies for joining different materials, but in the method using the adhesive film, a process using relatively higher heat and pressure than those of the process in which an adhesive agent is applied is required, and a deterioration speed by moisture in a high temperature and high humidity environment is increased, so that there is a disadvantage in that a strength loss of a joint portion is increased.

Further, when an adhesive agent is used for joining different materials, a joining temperature is room temperature or is lower than a temperature used when the method using the adhesive film is applied, so that there is advantages in that a joint portion is not degenerated due to heat and both high strength and air tightness of the joint portion may be achieved, but a wet phenomenon occurring between the adhesive agent and a surface of the basic material exerts a large influence on bonding strength, so that the joining using the adhesive agent essentially requires a process for improving wettability between the adhesive agent and the surface of the basic material by performing an appropriate surface treatment on a surface of metal or plastic, and to this end, there is a problem in that energy of the surface of the basic material needs to be increased or surface tension of the bonding agent needs to be decreased.

The method using the mechanical fastening tool, such as a screw or a rivet, is also a traditional method, and the mechanical fastening tool is generally heavy and requires high usage cost, so that the method using the mechanical fastening tool is not accordance with a lightening trend of the related art.

Since the different material joining method in the related art has the foregoing problems, there is a need for research for a method capable of improving joining force between different materials through a relatively simple process while solving the problems.

RELATED ART LITERATURE

Patent Document (Patent Document 1) Korean Patent No. 10-1499665

DETAILED DESCRIPTION OF THE INVENTION

Technical Problem

The present invention provides a joint body of different materials and a method of manufacturing the same.

Technical Solution

An exemplary embodiment of the present invention provides a joint body of different materials, comprising: a metal layer; and a resin layer provided on and in contact with one surface of the metal layer, wherein the metal layer comprises two or more etching grooves and two or more burrs provided on a surface of the metal layer adjacent to the etching grooves, the burrs are provided to form an acute angle with respect to the surface of the metal layer, the resin layer is fixed to the metal layer by filling the interior of the etching groove, the surface of the metal layer, and between the burrs, and a ratio of a depth of the etching groove to a width of an entrance of the etching groove is 3:1 to 14:1.

Another exemplary embodiment of the present invention provides a method of manufacturing the joint body of different materials.

The exemplary embodiment of the present invention provides a method of manufacturing a joint body of different materials, the method comprising; etching a metal layer to form an etched metal layer in which etching grooves and burrs are formed on a surface of the metal layer by irradiating the surface of the metal layer with a first laser; and forming a resin layer in which the resin layer is formed on one surface of the etched metal layer, wherein the burrs are provided to form an acute angle with respect to the surface of the metal layer, the resin layer is fixed to the metal layer by filling the interior of the etching grooves, the surface of the metal layer, and between the burrs, and a ratio of a depth of the etching groove to a width of an entrance of the etching groove is 3:1 to 14:1.

Advantageous Effects

According to the exemplary embodiments of the present invention, it is possible to improve an adhesive force between a metal and a resin.

Further, according to the exemplary embodiments of the present invention, it is possible to minimize a different material joining process and thus improve operation efficiency.

Furthermore, according to the exemplary embodiments of the present invention, it is possible to provide a joint body of different materials which is capable of securing air tightness such that air does not circulate and water tightness such that water does not circulate.

BEST MODE

Figure 1A:
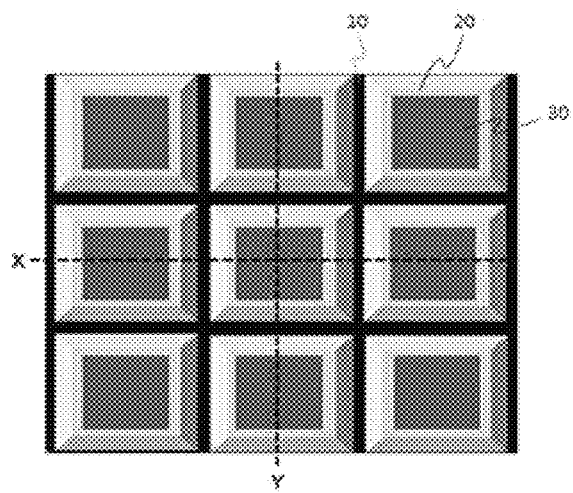
FIGS. 1A and 1B are a top plan view of a surface of an etched metal layer and a view of the metal layer observed by a scanning electron microscope (SEM) according to an exemplary embodiment of the present invention, respectively.

In the present specification, when it is said that a member is positioned "on" the other member, this includes a case where another member is present between the two members, as well as a case where the member is in contact with the other member.

In the present specification, unless explicitly described to the contrary, when it is said that a part "comprises/includes" a constituent element, this means that another constituent element may be further "included/comprised", not that another constituent element is excluded.

In order to solve the problems of the method of joining different materials in the related art, the present inventors intended to improve physical and chemical joining force to a different material by processing a surface of metal, thereby accomplishing the present invention.

The present inventors made a surface of metal have a specific form, particularly, made a burr provided on a surface of a metal layer have a specific shape to improve physical and chemical joining force to a material, such as a resin, unlike the method of joining different materials in the related art.

Hereinafter, the present specification will be described in more detail.

An exemplary embodiment of the present invention provides a joint body of different materials, comprising: a metal layer; and a resin layer provided on and in contact with one surface of the metal layer, wherein the metal layer comprises two or more etching grooves and two or more burrs provided on a surface of the metal layer adjacent to the etching grooves, the burrs are provided to form an acute angle with respect to the surface of the metal layer, the resin layer is fixed to the metal layer by filling the interior of the etching groove, the surface of the metal layer, and between the burrs, and a ratio of a depth of the etching groove to a width of an entrance of the etching groove is 3:1 to 14:1.

According to the exemplary embodiment of the present invention, a general metal layer may be used as the metal layer without a particular limit, but a metal layer in which a pattern is easily formed by means of the irradiation of a laser and which has excellent thermal conductivity may be used, and examples of the metal may include a pure metal, such as aluminum (Al), titanium (Ti) and the like, and an alloy, such as stainless steel (STS).

According to the exemplary embodiment of the present invention, as long as a form of the metal layer enables laser etching and facilitates joining with a resin, the form of the metal layer is not particularly limited, and the form of the metal layer may be, for example, a cylindrical shape including a plane and a curved surface, and a polyhedron.

According to the exemplary embodiment of the present invention, the resin layer may be formed of one or more selected from the group consisting of a polypropylene (PP) resin, a polyamide (PA) resin, a polyphenylene oxide (PPO) resin, and a reinforcement material contained resin, but the kind of resin layer is not limited.

Further, the reinforcement material may be one or more selected from the group consisting of glass fiber, talc, and carbon fiber, but the kind of reinforcement material is not limited.

According to the exemplary embodiment of the present invention, the metal layer may include two or more etching grooves, and may include two or more burrs provided on the surface of the metal layer while being adjacent to the etching grooves.

According to the exemplary embodiment of the present invention, the burrs may be provided in a distal direction from the etching groove. Particularly, the burr may be provided on the surface of the metal layer, may be provided to be adjacent to the etching groove, and may be protruded in the distal direction from the etching groove.

Further, according to the exemplary embodiment of the present invention, the burrs may be continuously or partially discontinuously provided in a progress direction of the etching groove.

According to the exemplary embodiment of the present invention, since the burr is provided in the distal direction from the etching groove and the metal layer includes two or more etching grooves, the burr provided in the distal direction from one etching groove and the burr provided in the distal direction from another etching groove adjacent to the one etching groove facing each other may be provided.

According to the exemplary embodiment of the present invention, a part of the metal layer may be melted in a distal direction from a center axis of the etching groove on the surface of the metal layer to be provided with the burrs.

According to the exemplary embodiment of the present invention, the remaining portion of the metal layer, except for the portion provided with the burrs, may be melted toward the center axis of the etching groove inside the metal layer formed with the etching groove.

According to the exemplary embodiment of the present invention, the burr may be provided at an acute angle with respect to the surface of the metal layer. Particularly, an angle between the burr provided in the distal direction from the etching groove and the surface of the metal layer may be an acute angle.

According to the exemplary embodiment of the present invention, the resin layer may be fixed to the metal layer and filled in the interior of the etching groove, the surface of the metal layer, and between the burrs to be fixed to the metal layer. Particularly, the resin layer may be filled in the interior of the etching groove and the interior of a fence formed by the burrs to be fixed to the metal layer.

According to the exemplary embodiment of the present invention, a ratio of a depth of the etching groove to a width of an entrance of the etching groove may be 3:1 to 14:1, or 3:1 to 13:1. Within the range, the resin layer may be sufficiently filled in the interior of the etching groove, thereby improving joining force between the metal layer and the resin layer.

In the present specification, the width of the entrance of the etching groove may mean a width of the etching groove on an extended line of the surface of the metal layer formed with the etching groove.

In the present specification, the depth of the etching groove may mean a maximum distance from a lowest point of one etching groove to an intersection point of an extended line of the metal layer and the center axis of the one etching groove.

According to the exemplary embodiment of the present invention, the width of the entrance of the etching groove may be 10 μm or more and 25 μm or less, or 10 μm or more and 20 μm or less.

Further, according to the exemplary embodiment of the present invention, the depth of the etching groove may be 50 μm or more and 250 μm or less, 50 μm or more and 240 μm or less, 60 μm or more and 250 μm or less, or 60 μm or more and 240 μm or less.

Further, according to the exemplary embodiment of the present invention, a width of a center of the etching groove may be 15 μm or more and 30 μm or less or 20 μm or more and 30 μm or less, and a ratio of the width of the center of the etching groove to the width of the entrance of the etching groove may be 1.3:1 to 3:1.

Within the range, the resin layer may be sufficiently filled in the interior of the etching groove, and thus, joining force between the metal layer and the resin layer may be improved.

In the present specification, the width of the center of the etching groove may mean a maximum distance between a point, which is a half of the depth of the etching groove and the etching groove.

According to the exemplary embodiment of the present invention, the burr may be provided in the distal direction from the etching groove, and an angle between the burr and the surface of the metal layer may be 30° or more and 80° or less.

In the present specification, the angle between the burr and the surface of the metal layer may mean an angle between the burr provided in the distal direction from the etching groove and the surface of the metal layer.

According to the exemplary embodiment of the present invention, a length from one end of the burr to the other end of the burr may be 25 μm or more and 80 μm or less, 25 μm or more and 70 μm or less, 30 μm or more and 80 μm or less, 30 μm or more and 70 μm or less, 30 μm or more and 50 μm or less, 35 μm or more and 70 μm or less, or 35 μm or more and 50 μm or less.

Further, according to the exemplary embodiment of the present invention, a height of the burr may be 30 μm or more and 100 μm or less, 30 μm or more and 90 μm or less, 40 μm or more and 100 μm or less, 40 μm or more and 90 μm or less, 40 μm or more and 80 μm or less, 50 μm or more and 90 μm or less, or 50 μm or more and 80 μm or less.

In the ranges of the length of the burr and the height of the burr, the resin layer may be sufficiently supplied and may be fixed to the metal layer with sufficient joining force.

Further, within the range, a high tension value of the joint body of different materials may be maintained, the burr may be easily controlled with a fence structure, and air tightness and water tightness of the joint body of different materials may be secured.

According to the exemplary embodiment of the present invention, a distance between the center axes of the etching grooves may be 50 μm or more and 1,000 μm or less, 50 μm or more and 800 μm or less, 80 μm or more and 1,000 μm or less, 80 μm or more and 800 μm or less, 80 μm or more and 500 μm or less, 100 μm or more and 500 μm or less, 80 μm or more and 250 μm or less, or 100 μm or more and 250 μm or less.

Within the range, the facing burrs are prevented from being merged, thereby preventing a vacant space structure in which the resin layer fails to be supplied from being formed, and a joint area between the structure formed by the etching grooves and the burrs and the resin layer is relatively increased, thereby achieving sufficient binding force.

In the present specification, the distance between the center axes of the etching grooves may mean a distance from an end of one etching groove having the largest depth to an end of another etching groove.

According to the exemplary embodiment of the present invention, the joining force between the metal layer and the resin layer may be increased as the height of the burr is large and a gap between the etching grooves is small.

According to the exemplary embodiment of the present invention, an angle of the burr to the surface of the metal layer may be 30° or more and 80° or less, 30° or more and 70° or less, 35° or more and 80° or less, 35° or more and 70° or less, 35° or more and 60° or less, 40° or more and 70° or less, or 40° or more and 60° or less.

In the range, the resin layer may be sufficiently filled the space between the burrs, the resin layer may be sufficiently fixed to the metal layer, and joining force between the metal layer and the resin layer may be maximized.

According to the exemplary embodiment of the present invention, the joining force between the metal layer and the resin layer may be 5 MPa or more, 7 MPa or more, 10 MPa or more, 15 MPa or more, or 20 MPa or more, and the joining force between the metal layer and the resin layer may be different according to the kind of resin layer.

In the present specification, the joining force between the metal layer and the resin layer may mean tensile strength and/or shearing strength of the resin layer to the metal layer.

According to the exemplary embodiment of the present invention, a progress direction of one etching groove may be parallel to a progress direction of another etching groove. Further, a progress direction of one etching groove may intersect with a progress direction of another etching groove at a right angle or at an oblique angle.

Figure 1B:
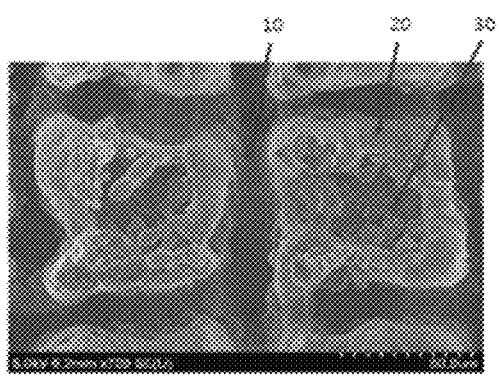

According to the exemplary embodiment of the present invention, FIGS. 1A and 1B illustrate a schematic diagram of the surface of the metal layer provided with the etching grooves and the burrs, and an image of the surface of the metal layer photographed by a scanning electron microscope (SEM), respectively.

According to FIG. 1, it can be confirmed that when a progress direction X of one etching groove 10 intersects with a progress direction Y of another etching groove 10 at a right angle, burrs 20 provided in a distal direction from the etching groove are continuously or discontinuously provided in the progress directions X and Y of the etching groove 10, and a space 30 surrounded by the burr 20 may be provided in a form of a square or a rectangle.

Further, according to FIG. 1, the surface of the metal layer may have a form of a lattice structure. Particularly, as illustrated in FIG. 1, the lattice structure may be a structure formed by the etching grooves 10 as the progress direction X of one etching groove and intersects with (particularly, is orthogonal to) the progress direction Y of another etching groove.

As described above, when the pattern having the lattice structure is formed on the surface of the metal layer by one etching groove and another etching groove, the joint body of different materials according to the exemplary embodiment of the present invention may implement not only the secure joining force between the metal layer and the resin layer but also the air tightness such that air does not circulate and water tightness such that water does not circulate.

Figure 2:
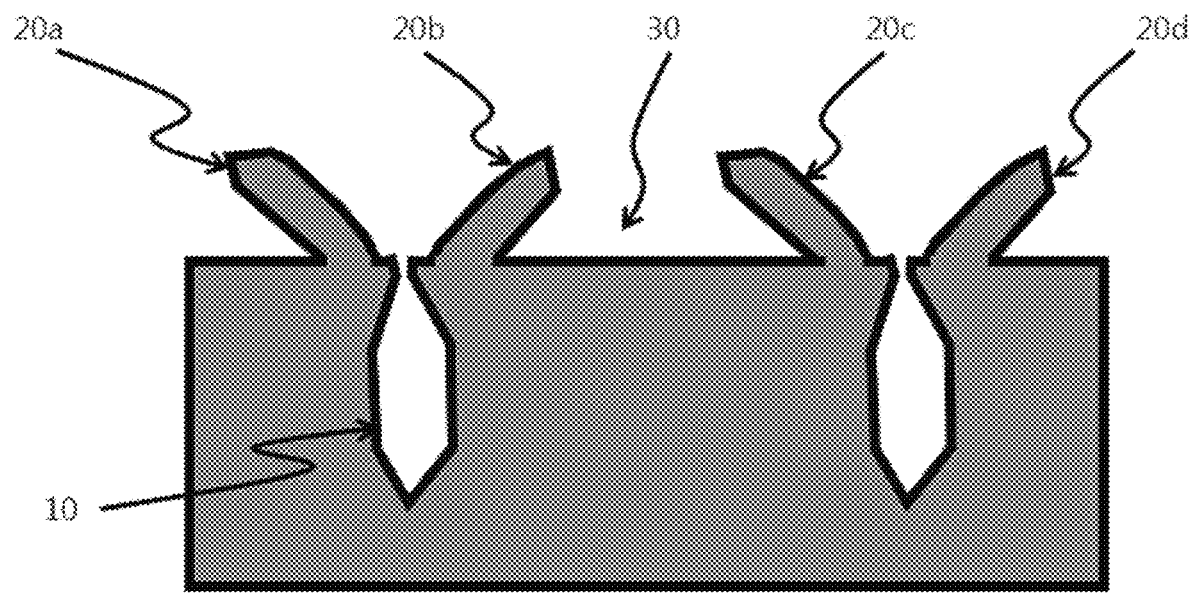
FIG. 2 is a lateral cross-sectional view of a metal layer according to an exemplary embodiment of the present invention.

FIG. 2 illustrates a schematic diagram of a lateral surface of the metal layer according to the exemplary embodiment of the present invention.

According to FIG. 2, the etching groove 10 in the unit of micrometer (μm) is provided on the surface of the metal layer, and burrs 20a and 20b may be provided in a distal direction from the etching groove while being adjacent to the etching groove.

Further, according to FIG. 2, the burr may be provided on the surface of the metal layer in the form pushed outwardly from the surface of the metal layer, and the burr may be provided in the form protruding so as to be far from the etching groove.

Further, according to FIGS. 1 and 2, the burr 20b provided on the surface of the metal layer while being adjacent to one etching groove 10 and the burr 20c provided on the surface of the metal layer while being adjacent to another etching groove are continuously or discontinuously provided to face each other, so that a fence including four planes and formed with the space 30 therein may be finally provided.

Further, according to FIG. 2, the burr 20b among the burrs adjacent to one etching groove 10 provided in the metal layer according to the exemplary embodiment of the present invention and the burr 20c among the burrs adjacent to another etching groove are continuously or discontinuously provided to face each other, a pair of facing burrs (not illustrated) provided in a progress direction of another etching groove is connected to the burrs indicated by reference numerals 20b and 20c, respectively, so that the fence formed with the space 30 therein may be provided.

Further, when the progress direction of one etching groove is orthogonal to the progress direction of another etching groove, a cross section shape of the progress direction of one etching groove may be very similar to a cross section shape of the progress direction of another etching groove, but when the progress direction of one etching groove obliquely intersects with the progress direction of another etching groove, a cross section shape of the progress direction of one etching groove may be different from a cross section shape of the progress direction of another etching groove.

Further, according to the exemplary embodiment of the present invention, the joint body of different materials may implement or secure air tightness (air inflow blocking performance) and water tightness (water inflow blocking performance). Particularly, the air tightness may be secured when the metal layer and the resin layer are joined without forming pores. Particularly, the air tightness may be confirmed by measuring pressure loss for a predetermined time under a pneumatic condition, and may be different according to the kind and the form of the metal and the kind of the resin, which are used as the different materials, and for example, in the case of testing a joint body of different materials for 30 seconds under a pneumatic condition of 30.52 PSIG (2 bar) after joining the different materials, and when a pressure loss satisfies 0.057 PSIG or less, it may mean that air tightness is secured.

Another exemplary embodiment of the present invention provides a method of manufacturing the joint body of different materials.

The exemplary embodiment of the present invention provides a method of manufacturing a joint body of different materials, the method comprising; etching a metal layer to form an etched metal layer in which etching grooves and burrs are formed on a surface of the metal layer by irradiating the surface of the metal layer with a first laser; and forming a resin layer in which the resin layer is formed on one surface of the etched metal layer, wherein the burrs are provided to form an acute angle with respect to the surface of the metal layer, the resin layer is fixed to the metal layer by filling the interior of the etching grooves, the surface of the metal layer, and between the burrs, and a ratio of a depth of the etching groove to a width of an entrance of the etching groove is 3:1 to 14:1.

According to the exemplary embodiment of the present invention, the first laser irradiated on the surface of the metal layer may form a pattern with a specific design on the surface of the metal, by being irradiated on the surface of the metal. According to the exemplary embodiment of the present invention, the first laser may be irradiated on the surface of the metal, so that the etching groove may be formed in a progress direction of the first laser.

That is, the progress direction of the first laser may correspond to the progress direction of the etching groove.

Further, two or more first lasers may be irradiated on the surface of the metal layer, and the progress directions of the two or more first lasers may intersect with each other. Particularly, the process direction of one first laser may intersect with the process direction of another first laser.

According to the exemplary embodiment of the present invention, when the surface of the metal layer is etched in a lattice structure by the irradiation of one first laser and another first laser, the burr pushed outwardly from the surface of the etched metal layer may protrude from the surface of the metal layer while being adjacent to the etching groove in a distal direction from the etching groove.

Further, according to the exemplary embodiment of the present invention, the burrs may be continuously or partially discontinuously provided according to the irradiation of the first laser.

According to the exemplary embodiment of the present invention, by the irradiation of the first laser, the etching groove in the unit of micrometer (μm) may be formed on the surface of the metal layer and the burr may be formed in the distal direction from the etching groove while being adjacent to the etching groove, and the etching groove may be formed in the progress direction of the first laser, so that the burrs which are adjacent to the etching groove formed in the progress direction of one first laser and the etching groove formed in the progress direction of another first laser, respectively, are continuously provided to face each other, and thus a fence including four planes and formed with a space therein may be finally formed.

Particularly, one burr among the burrs adjacent to one etching groove and one burr among the burrs adjacent to another etching groove are continuously provided to face each other, and the pair of facing burrs formed in the progress direction of another first laser is connected to other burrs, respectively, so that the fence formed with a space therein may be formed.

In the meantime, when the progress direction of one first laser is orthogonal to the progress direction of another first laser, a cross section shape of the progress direction of one first laser may be very similar to a cross section shape of the progress direction of another first laser, but when the progress direction of one first laser obliquely intersects with the progress direction of another first laser, a cross section shape of the progress direction of one first laser may be different from a cross section shape of the progress direction of another first laser.

According to the exemplary embodiment of the present invention, the metal layer, the resin layer, the etching groove, and the burr are as described above.

According to the exemplary embodiment of the present invention, a wavelength of the first laser may be 1,064 nm.

According to the exemplary embodiment of the present invention, an output of the first layer may be 20 W or more and 200 W or less, 20 W or more and 100 W or less, 20 W or more and 50 W or less, or 20 W or more and 40 W or less.

According to the exemplary embodiment of the present invention, a frequency of the first laser may be 30 kHz or more and 600 kHz or less, 30 kHz or more and 200 kHz or less, 40 kHz or more and 600 kHz or less, or 40 kHz or more and 200 kHz or less.

In the present specification, the frequency of the first laser may mean the number of vibrations of a pulse laser per second.

According to the exemplary embodiment of the present invention, a scanning speed of the first layer may be 100 mm/s or more and 1,000 mm/s or less, 100 mm/s or more and 400 mm/s or less, 200 mm/s or more and 1,000 mm/s or less, 200 mm/s or more and 400 mm/s or less, 200 mm/s or more and 450 mm/s or less, 300 mm/s or more and 400 mm/s or less, or 300 mm/s or more and 450 mm/s or less.

In the present specification, the scanning speed of the pulse laser may mean a movement speed of the travelling laser from one point to the other point.

According to the exemplary embodiment of the present invention, the number of times of the irradiation of the first laser may be 1 or more and 10 or less, 1 or more and 8 or less, 1 or more and 4 or less, 2 or more and 10 or less, 2 or more and 8 or less, 2 or more and 4 or less, or 4 or more and 8 or less.

According to the exemplary embodiment of the present invention, a pulse width of the first laser may be 15 ns or more and 220 ns or less.

According to the exemplary embodiment of the present invention, a spot size of the first laser may be 15 μm or more and 50 μm or less, 25 μm or more and 50 μm or less, 30 μm or more and 50 μm or less, or 35 μm or more and 50 μm or less.

In the present specification, the spot size (or beam size) may mean a maximum distance from an end of one side of the focus of the pulse laser to an end of the other side of the focus of the pulse laser.

According to the exemplary embodiment of the present invention, a peak output of the first laser may be 1.5 kW or more and 6 kW or less, 1.5 kW or more and 3.4 kW or less, 1.9 kW or more and 6 kW or less, or 1.9 kW or more and 3.4 kW or less.

According to the exemplary embodiment of the present invention, pulse energy of the first laser may be 0.1 mJ or more and 2 mJ or less, 0.1 mJ or more and 1 mJ or less, 0.5 mJ or more and 2 mJ or less, or 0.5 mJ or more and 1 mJ or less.

Under the irradiation condition of the first laser, the ranges for a depth of the etching groove, a width of the entrance of the etching groove, a width of a center of the etching groove, a length of the burr, a height of the burr, and an angle range formed between the burr and the surface of the metal layer may be implemented, thereby increasing joining force between the metal layer and the resin layer.

Particularly, under an energy condition of the first laser, the material evaporated from a wall of the etching groove and the entrance of the etching groove may be re-condensed, and the burr protruding from the metal layer may be relatively roughly formed, and as a result, an area and an anchoring structure in which the metal layer may be joined to the resin layer may be formed.

According to the exemplary embodiment of the present invention, the first laser may be irradiated in a depth direction, and a part of the metal layer may be melted in a distal direction from a center axis of the etching groove on the surface of the metal layer according to the irradiation of the first laser to be provided with the burr.

Further, According to the exemplary embodiment of the present invention, the remaining portion of the metal layer, except for the portion provided with the burr according to the irradiation of the first laser, may be melted toward the center axis of the etching groove inside the metal layer formed with the etching groove. Accordingly, the etching groove having a relatively narrow entrance width may be formed.

Particularly, the metal layer may be rapidly melted according to the irradiation of the first laser, and then, the melted metal layer may be cooled while a focus of the first laser moves, and the melted metal layer may be cooled starting from the portion adjacent to the etching groove, so that the etching groove having a relatively narrow entrance width compared to a width of a center thereof may be formed.

According to the exemplary embodiment of the present invention, the descriptions of the metal layer and the resin layer are as described above.

According to the exemplary embodiment of the present invention, the forming of the resin layer may be performed by applying resin to each of the surface of the metal layer, the etching grooves, and the burrs. Particularly, the forming of the resin layer may be performed (insert molding) by a method of using the metal layer of which the surface is etched as a mold, applying the resin layer to the mold, and joining the resin layer to the mold by applying pressure.

Further, according to the exemplary embodiment of the present invention, the forming of the resin layer may be performed by preparing a different material laminate body in which the resin layer is provided on one surface of the metal layer of which the surface is etched, and irradiating the different material laminate body with a second laser.

According to the exemplary embodiment of the present invention, an internal space of a fence by the etching groove and the burr may be formed on the surface of the metal layer by the irradiation of the first laser, the different material laminate body, in which the resin layer is provided on the surface of the metal layer, may be irradiated with a second laser, and the resin layer may be joined to the metal layer by melting the resin layer.

According to the exemplary embodiment of the present invention, the second laser may be emitted in a direction from the resin layer to the metal layer.

Further, according to the exemplary embodiment of the present invention, the second laser may be irradiated on and be focused on the surface of the metal layer, which is in contact with the resin layer.

Further, according to the exemplary embodiment of the present invention, the second laser may be irradiated to penetrate the resin layer.

That is, according to the exemplary embodiment of the present invention, the second laser may be irradiated in the direction from the resin layer to the metal layer to penetrate the resin layer by focusing on the surface of the metal layer, which is in contact with the resin layer.

Accordingly, energy of the second laser may be absorbed in the metal layer and the absorbed energy of the second laser may be converted to heat, so that the resin layer adjacent to the surface of the metal layer may be melted.

According to the exemplary embodiment of the present invention, the second laser may be irradiated in the direction from the metal layer to the resin layer.

Further, the second laser may be irradiated by focusing on an opposite surface of the surface of the metal layer, which is in contact with the resin layer.

That is, according to the exemplary embodiment of the present invention, the second laser may be irradiated in the direction from the metal layer to the resin layer, by focusing on the surface of the metal layer, which is in contact with the resin layer.

Accordingly, the energy of the second laser may be absorbed in the metal layer and the absorbed energy of the second laser may be converted to heat, so that a plastic resin adjacent to the surface of the metal layer may be melted.

Figure 3:
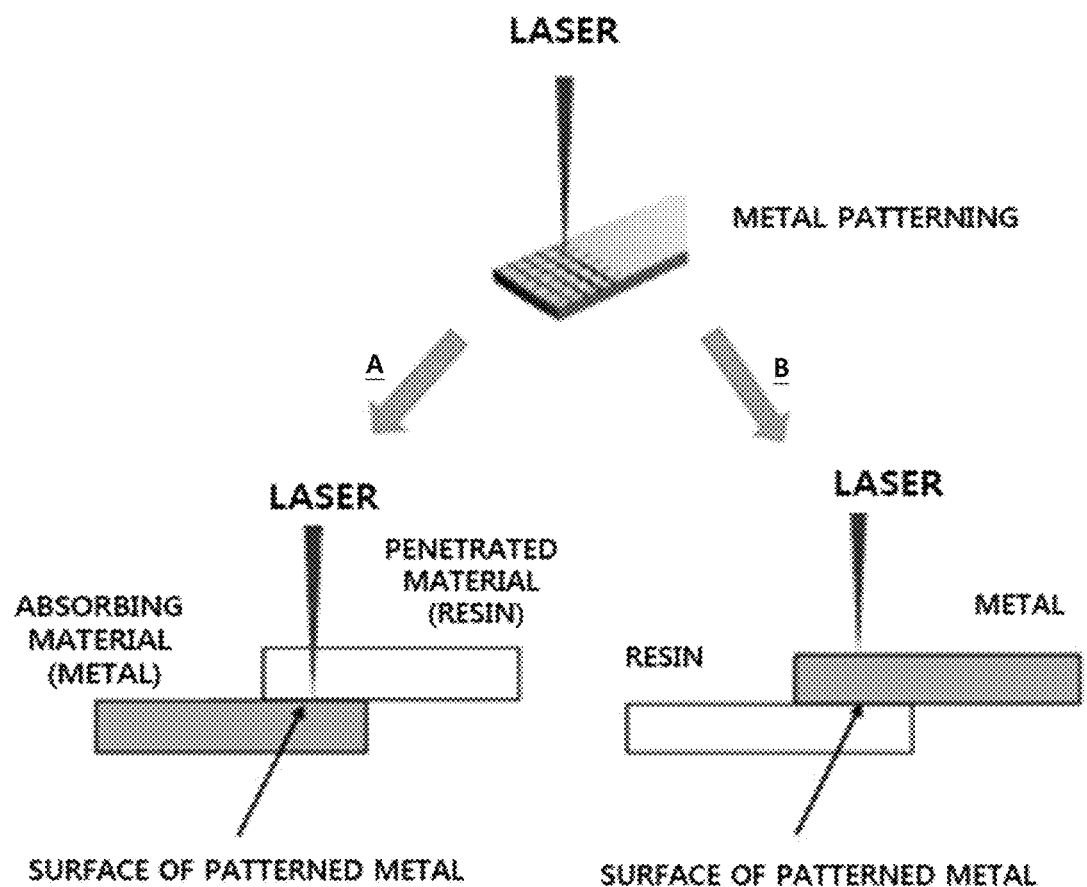
FIG. 3 is a diagram illustrating various states in which a resin layer is joined to a surface of the metal layer by using a laser according to an exemplary embodiment of the present invention.

FIG. 3 is a diagram illustrating various forms in which the resin layer is joined to the surface of the etched metal layer by means of the irradiation of the second laser according to the exemplary embodiment of the present invention.

According to FIG. 3, pathway A illustrates a state in which the resin layer is joined (laser transmission joining) to the metal layer by means of the irradiation of the second laser in the direction from the resin layer to the metal layer, so that the second laser penetrates the resin layer by focusing on the surface of the metal layer, which is in contact with the resin layer, and pathway B illustrates a state in which the resin layer is joined (laser heat conduction joining) to the metal layer by means of the irradiation of the second laser, in the direction from the metal layer to the resin layer, by focusing on the opposite surface of the surface of the metal layer, which is in contact with the resin layer.

As described above, after the surface of the metal layer is etched by means of the irradiation of the first laser, the second laser needs to be emitted again so that the metal layer is joined to the resin layer, and an example of the method of the irradiation of the second laser may include the laser transmission joining and the laser heat conduction joining illustrated in FIG. 3.

Further, in order to decrease a time consumed for joining the metal layer and the resin layer and improve joining efficiency by heat conduction, an additional heat source (for example, a laser, a heater, or a hot plate), cooling gas, and the like may be further supplied to an upper portion or a lower portion as necessary.

The laser transmission joining (FIG. 3A) may be a method of joining the metal layer and the resin layer by irradiating the second laser on the different material laminate body, in the direction from the resin layer to the metal layer, by focusing on the surface of the metal layer which is in contact with the resin layer, and by penetrating the resin layer.

Further, the laser heat conduction joining (FIG. 3B) may be a method of joining the metal layer and the resin layer by irradiating the second laser on the different material laminate body, in the direction from the metal layer to the resin layer, and by focusing on the opposite surface of the surface of the metal layer which is in contact with the resin layer.

Particularly, when the second laser is irradiated in the direction from the metal layer to the resin layer, energy of the second laser may be absorbed in the metal layer and the absorbed energy of the second laser may be converted to heat, so that the resin layer adjacent to the surface of the metal layer may be melted.

According to the exemplary embodiment of the present invention, the resin layer may be melted by the second laser, and the melted resin layer may be fixed to the surface of the metal layer and be filled in the surface of the metal layer, the etching groove, and between the burrs.

Particularly, the method of melting the resin layer may be varied according to the irradiation direction of the second laser, and when the pulse laser is irradiated by the laser transmission joining (FIG. 3A), the second laser irradiated onto the resin layer penetrates the resin layer and the energy of the second laser is absorbed in the surface of the metal layer, the absorbed energy is converted to heat to melt the resin layer on an interface (a surface in which the metal layer is in contact with the resin layer), and then the melted resin layer is supplied to the surface of the metal layer, the etching groove, and the internal space of the burr shaped like a fence, so that the different materials are joined to each other.

Further, when the second laser is irradiated by the laser heat conduction joining (FIG. 3B), first, a laser beam emitted to the metal layer of which the surface is etched is absorbed in the metal layer, the absorbed energy is converted to heat to melt the resin layer on an interface (a surface in which the metal layer is in contact with the resin layer), and the melted resin layer is supplied to the surface of the metal layer, the etching groove, and the internal space of the burr shaped like a fence, so that the different materials are joined to each other.

As described above, when the different materials, such as the metal layer and the resin layer, are joined by any one method of the laser transmission joining method and the laser heat conduction joining method, joining strength is improved, and a local joining is available at a target position and a target area, so that efficiency is excellent.

According to the exemplary embodiment of the present invention, a wavelength of the second laser may be a wavelength in a near-infrared ray region. Particularly, the wavelength of the second laser may be one kind of wavelength selected from the group consisting of 808 nm, 830 nm, 880 nm, 915 nm, 940 nm, 915 nm, and 1,064 nm.

According to the exemplary embodiment of the present invention, an output of the second laser may be 50 W or more and 2,000 W or less, and may be appropriately adjusted according to a spot size of the laser and the kind of material which is irradiated with the laser.

According to the exemplary embodiment of the present invention, the spot size of the second laser may be 100 μm or more and 5,000 μm, and may be appropriately adjusted according to the kind of material which is irradiated with the laser.

According to the exemplary embodiment of the present invention, a scanning speed of the second laser may be 10 mm/s or more and 1,000 mm/s or less, and may be appropriately adjusted according to the kind of material which is irradiated with the laser.

According to the exemplary embodiment of the present invention, the number of times of the irradiation of the second laser may be one or more and 50 or less, and may be appropriately adjusted according to the kind of material which is irradiated with the laser.

According to the exemplary embodiment of the present invention, the joining force between the metal layer and the resin layer is as described above.

When the method of joining the different materials according to the exemplary embodiment of the present invention is used, the resin layer on the interface between the metal layer and the resin layer is melted, so that the resin layer flows into the etching groove of the etched metal layer and the internal space of the burr shaped like the fence formed along the etching groove, as well as the surface of the metal layer, thereby achieving a more enhanced anchoring effect.

Further, according to the exemplary embodiment of the present invention, unlike the method of joining the different materials in the related art, there is no concern in the problem in that an environment is contaminated due to chemical toxic substances or it is difficult to manage a mass production process, and it is possible to improve operation efficiency by minimizing a process stage and to provide a joint body of different materials capable of implementing air tightness and water tightness.

Hereinafter, the present invention will be described in detail with reference to Examples for more concretely explaining the present invention. However, the Examples according to the present invention may be modified into other various forms, and it is not construed that the scope of the present invention is limited to the Examples described below. The Examples of the present specification are provided for more completely explaining the present invention to those skilled in the art.

[Relation Between Width of Entrance of Etching Groove and Width of Center of Etching Groove]

Example 1 and Reference Example 1

An aluminum substrate was etched so as to have a lattice structure by double irradiating a surface of an aluminum substrate having a thickness of 1.5 T with two kinds of pulse lasers under the condition represented in Table 1 below so that the pulse lasers are orthogonal to each other. In this case, etching grooves and burrs generated during the etching were connected with each other along peripheral portions of the etching grooves to be formed in a shape of a fence having an internal space.

Subsequently, the patterned aluminum substrate faced a polypropylene resin substrate having a thickness of 3.2 T and then the aluminum substrate was irradiated with a laser having a spot size of 660 μm with an output of 350 W at a wavelength of 1,064 nm in a state where the aluminum substrate headed in an upper direction, and in this case, the polypropylene resin was melted by repeatedly scanning the laser five times at a scanning speed of 20 mm/s, thereby manufacturing a joint body of different materials.

A depth of the etching groove formed as described above, a width of an entrance of the etching groove, and a width of a center of the etching groove, and joining force (shearing tensile strength) were measured, and a result of the measurement is represented in Table 2 below.

Particularly, in order to measure a depth of the etching groove, a width of an entrance of the etching groove, a width of a center of the etching groove, a depth of the burr, a height of the burr, a specimen was manufactured by cutting the joint body of different materials in a vertical direction of an interface portion and polishing the cut joint body of different materials.

An image of a cross section of the specimen photographed by using an SEM is illustrated in FIG. 4.

Further, an average value of the measurement values of the respective shapes (a depth of the etching groove, a width of an entrance of the etching groove, a width of a center of the etching groove, a depth of the burr, and a height of the burr) in 10 to 20 grooves per each specimen was calculated and recorded.

Further, the joining force of the joint body of different materials was measured based on strength at which the joint body of different materials was separated or fractured when shearing is applied at a tension speed of 10 mm/min by using the UTM tensile machine (INSTRON 5969). Final joining strength was calculated by dividing the measured tensile strength value by a joined area.

TABLE 1

|  | Pulse width (ns) | Spot size (μm) | Output (W) | Frequency (kHz) | scanning speed (mm/s) | Number of times of emission (times) |
|---|---|---|---|---|---|---|
| Example 1 | 220 | 35 | 25 | 40 | 200 | 2 |
| Comparative Example 1 | 220 | 50 | 30 | 20 | 500 | 8 |

TABLE 2

| | Depth of etching groove (μm) | Width of entrance of etching groove (μm) | Width of center of etching groove (μm) | Joining force (MPa) |
|---|---|---|---|---|
| Example 1 | 80 | 10 to 15 | 20 to 30 | 11 |
| Reference Example 1 | 100 | 10 to 15 | 10 to 15 | 6 |

Figure 4A:
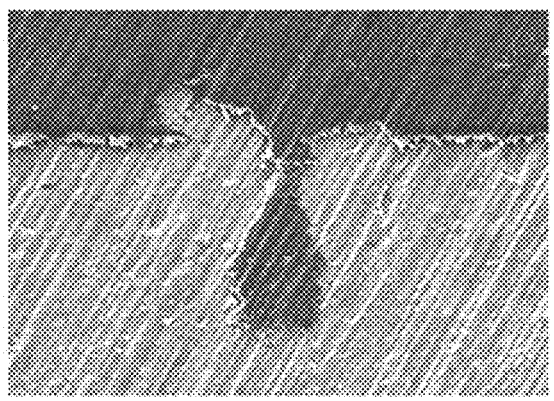
FIGS. 4A and 4B are images of lateral surfaces of Example 1 and Reference Example 1 photographed by an SEM, respectively.
Figure 4B:
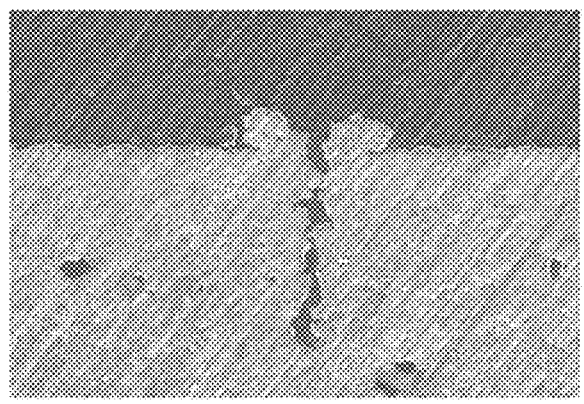

According to the results of Table 2 and FIG. 4, it can be confirmed that even though the widths of the entrances of the etching grooves are similar to each other and the depths of the etching grooves are similar to each other, the joining force of Example 1 (FIG. 4A) in which the width of the center of the etching groove is larger, so that the etching groove has a shape of a pot is larger than the joining force of Reference Example 1 (FIG. 4B) in which the width of the entrance of the etching groove and the width of the center of the etching groove are similar to each other.

Accordingly, it can be confirmed that even though the widths of the entrances of the etching grooves and the depths of the etching grooves are similar to each other, when the etching grooves have the shape of the pot, the excellent joining strength may be achieved.

[Relation Between Width of Entrance of Etching Groove and Depth of Etching Groove]

Example 2 and Comparative Example 1

An aluminum substrate was etched so as to have a lattice structure by double irradiating a surface of an aluminum substrate having a thickness of 1.5 T with two kinds of pulse lasers under the condition represented in Table 3 below so that the pulse lasers are orthogonal to each other. In this case, etching grooves and burrs generated during the etching were connected with each other along peripheral portions of the etching grooves to be formed in a shape of a fence having an internal space.

Subsequently, the patterned aluminum substrate faced a polypropylene resin substrate having a thickness of 3.2 T and then the aluminum substrate was irradiated with a laser having a spot size of 660 μm with an output of 350 W at a wavelength of 1,064 nm in a state where the aluminum substrate headed in an upper direction, and in this case, the polypropylene resin was melted through heat conduction by repeatedly scanning the laser five times at a scanning speed of 20 mm/s, thereby manufacturing a joint body of different materials.

A depth of the etching groove, a width of an entrance of the etching groove, a ratio (aspect ratio) of the depth of the etching groove and the width of the entrance of the etching groove, and joining force (shearing tensile strength) of the joint body of different materials manufactured as described above were measured by the foregoing method, and a result of the measurement is represented in Table 4 below.

TABLE 3

| | Pulse width (ns) | Spot size (μm) | Output (W) | Frequency (kHz) | scanning speed (mm/s) | Number of times of emission (times) |
|---|---|---|---|---|---|---|
| Example 2 | 220 | 35 | 25 | 40 | 200 | 2 |
| Comparative Example 2 | 220 | 50 | 30 | 20 | 500 | 8 |

TABLE 4

| | Depth of etching groove (μm) | Width of entrance of etching groove (μm) | Aspect ratio | Joining force (MPa) |
|---|---|---|---|---|
| Example 2 | 60 to 70 | 15 to 20 | 3 to 4.7 | 7 |
| Comparative Example 1 | 60 to 70 | 35 to 40 | 1.5 to 2 | 6.4 |

Figure 5A:
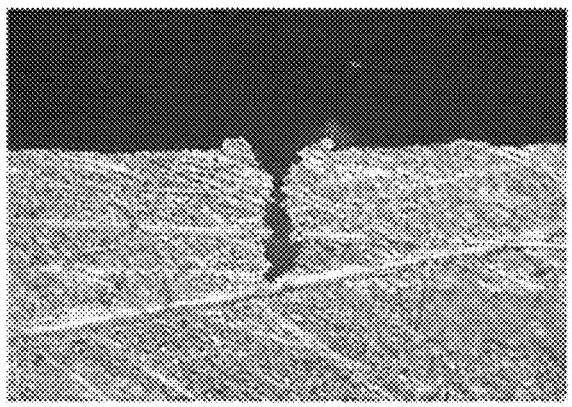
FIGS. 5A and 5B are images of lateral surfaces of Example 2 and Comparative Example 1 photographed by an SEM, respectively.
Figure 5B:
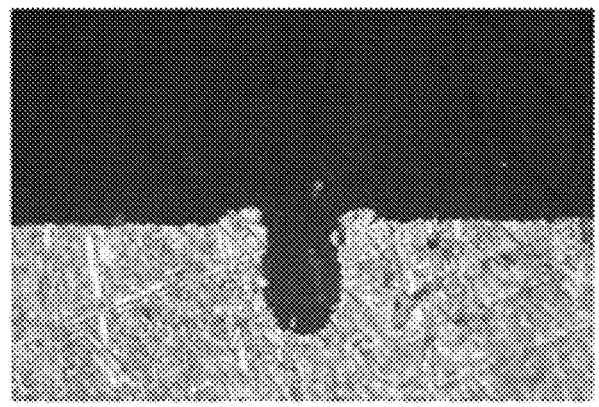
Figure 6A:
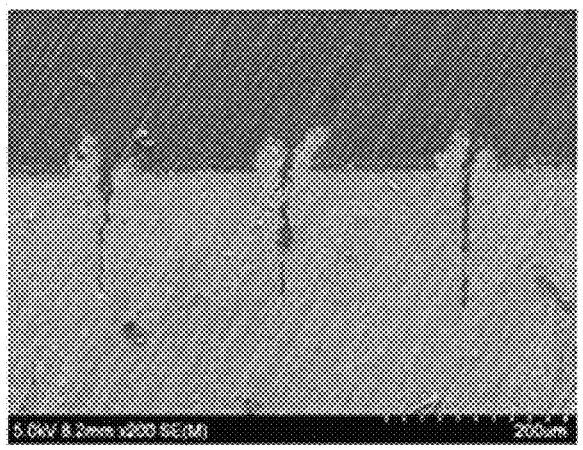
FIGS. 6A to 6E are images of lateral surfaces of Example 4, Example 5, and Comparative Examples 2 to 4 photographed by an SEM, respectively.
Figure 6B:
Figure 6C:
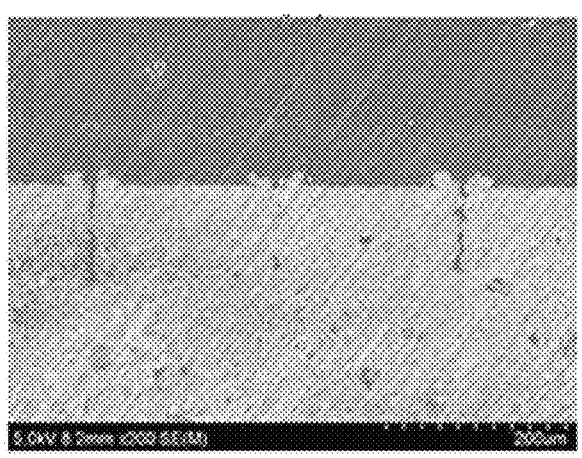
Figure 6D:
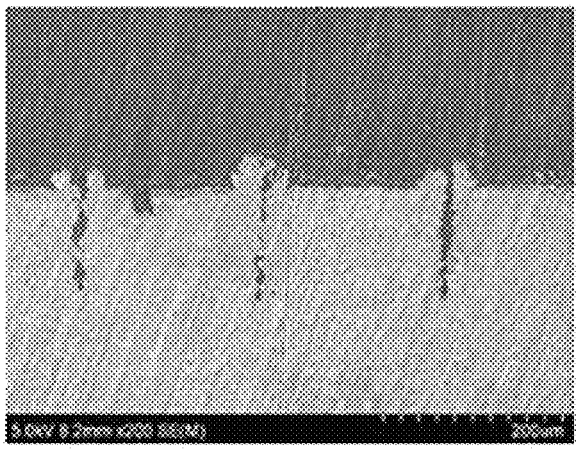
Figure 6E:
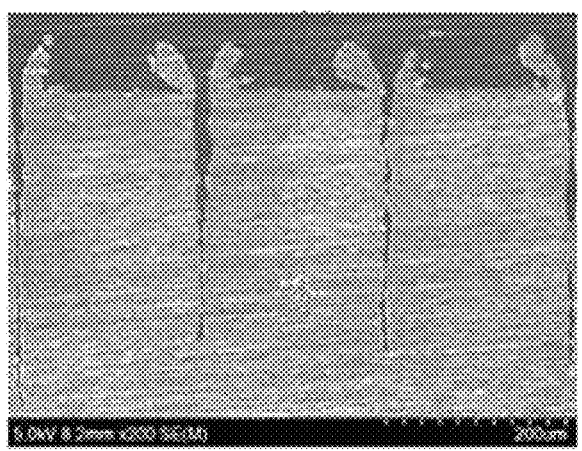
Figure 7A:
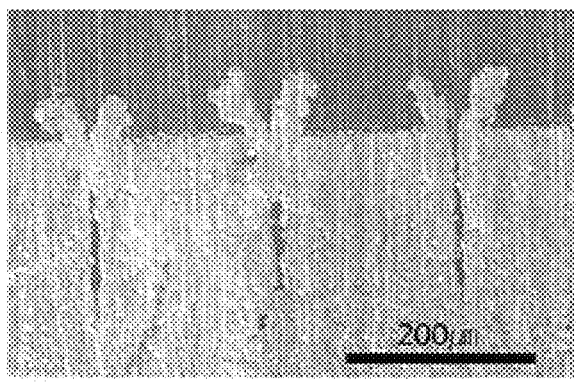
FIGS. 7A to 7D are images of lateral surfaces of Example 3 and Reference Examples 2 to 4 photographed by an SEM, respectively.
Figure 7B:
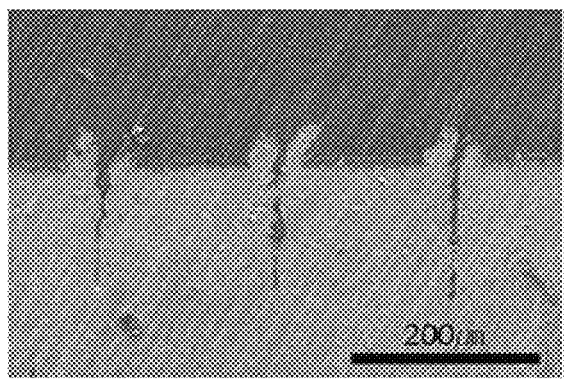
Figure 7C:
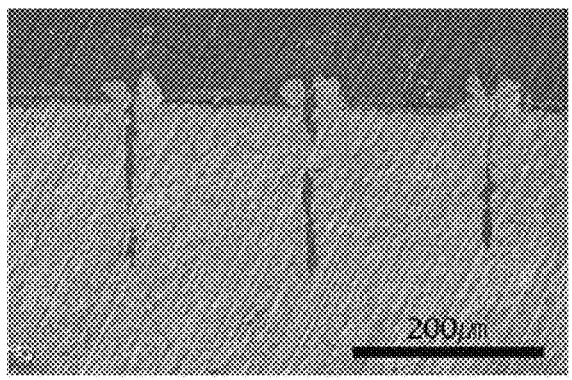
Figure 7D:
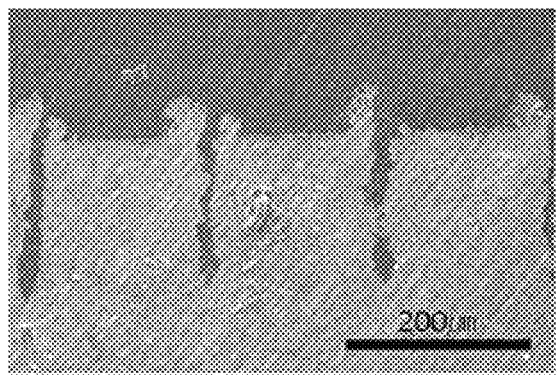

Further, images of lateral surfaces of Example 2 and Comparative Example 1 photographed by an SEM are illustrated in FIGS. 5A and 5B, respectively.

According to the results of Table 4 and FIG. 5, it can be confirmed that the width of the entrance of the etching groove of Comparative Example 1 (FIG. 5B) is larger than the width of the entrance of the etching groove of Example 2 (FIG. 5A), but the joining force of Comparative Example 1 is lower than the joining force of Example 1 by about 10%.

Accordingly, it can be confirmed that it is not that joining force is increased when the width of the entrance of the etching groove is large and the quantity of resin layer filling the metal layer is increased, but when the resin layer is fixed to the metal layer via the burrs protruding from the surface of the metal layer and the shape (curve or roughness) of the lateral wall of the etching groove, excellent joining strength may be achieved.

Examples, 4 and 5, and Comparative Examples 2 to 4

An aluminum substrate was etched so as to have two structures including a linear structure and a lattice structure by means of the irradiation of two kinds of pulse lasers under the condition represented in Table 5 below to a surface of an aluminum substrate having a thickness of 1.5 T. In this case, etching grooves and burrs generated during the etching were connected with each other along peripheral portions of the etching grooves to be formed in a shape of a fence having an internal space.

Subsequently, the patterned aluminum substrate faced a polypropylene resin substrate having a thickness of 3.2 T and then the aluminum substrate was irradiated with a laser having a spot size of 660 μm with an output of 350 W at a wavelength of 1,064 nm in a state where the aluminum substrate headed in an upper direction, and in this case, the polypropylene resin was melted by repeatedly scanning the laser five times at a scanning speed of 20 mm/s, thereby manufacturing a joint body of different materials.

A depth of the etching groove, a width of an entrance of the etching groove, a ratio (aspect ratio) of the depth of the etching groove and the width of the entrance of the etching groove, a length of the burr, and joining force (shearing tensile strength) of the joint body of different materials manufactured as described above were measured by the foregoing method, and a result of the measurement is represented in Table 6 below.

TABLE 5

|  | Output (W) | Frequency (kHz) | scanning speeds (mm/s) | Number of times of emission (times) |
|---|---|---|---|---|
| Comparative Example 2 | 30 | 70 | 200 | 1 |
| Comparative Example 3 | 30 | 70 | 200 | 2 |
| Example 4 | 30 | 70 | 200 | 4 |
| Example 5 | 30 | 70 | 200 | 8 |
| Comparative Example 4 | 30 | 70 | 200 | 16 |

TABLE 6

|  | Depth of etching groove (μm) | width of entrance of etching groove (μm) | Aspect ratio | Length of burr (μm) | Joining force (Mpa) | |
|---|---|---|---|---|---|---|
|  |  |  |  |  | Linear structure | Lattice structure |
| Comparative Example 2 | 98 | 8 | 12.3 | 20 | 3.1 | 6.2 |
| Comparative Example 3 | 119 | 8.5 | 14 | 35 | 5 | 9 |
| Example 4 | 170 | 13.5 | 12.6 | 35 | 7.1 | 9 |
| Example 5 | 231 | 18 | 12.8 | 50 | 7.2 | 10.1 |
| Comparative Example 4 | 305 | 21 | 14.52 | 50 | 6.8 | 10.1 |

Further, images of lateral surfaces of Examples 4 and 5, and Comparative Examples 2 to 4 photographed by an SEM are illustrated in FIGS. 6A to 6E, respectively.

According to the results of Table 6 and FIG. 6, it can be confirmed that when the number of times of emission of the first laser is increased, the depth of the etching groove, the width of the entrance of the etching groove, and the length of the burr are increased.

As a result of the evaluating the joining strength, it can be confirmed that in the case of Comparative Example 2, the width of the entrance of the etching groove and the length of the burr fail to reach the range according to the exemplary embodiment of the present invention, so that the joining force of Comparative Example 2 is lower than the joining force of Examples 4 and 5.

Further, it can be confirmed that in the case of Comparative Example 3, the width of the entrance of the etching groove fails to reach the range according to the exemplary embodiment of the present invention, so that the joining force of Comparative Example 3 is lower than the joining force of Examples 4 and 5.

Further, it can be confirmed that in the case of Comparative Example 4, the aspect ratio exceeds 1:14, so that the depth of the etching groove is increased, but the joining force is not increased any more.

Accordingly, it can be confirmed that even though the number of times of the emission of the first laser is increased, a joining effect by unevenness according to the burrs on the surface of the metal layer is decreased according to the characteristics of repeated processing.

Further, it can be confirmed that when the fence structure is formed by using the etching grooves formed as the lattice structure, a contact area with the resin layer is increased compared to the linear structure, and the joining strength is increased by an anchoring structure by a well shape compared to that of the linear structure.

Further, regarding the number of times of the emission of the laser, when the number of times of the emission of the laser is increased, the joining strength tends to be increased in both the linear structure and the lattice structure.

Further, it can be confirmed that when an increase in the depth of the entrance of the etching groove is considerably larger than an increase in the width of the entrance of the etching groove, the resin layer does not sufficiently fill the metal layer, and thus the joining force between the metal layer and the resin layer is not increased.

[Relation Between Length of Burr and Joining Force of Joint Body of Different Materials]

Example 3 and Reference Examples 2 to 4

An aluminum substrate was etched so as to have a lattice structure by double irradiating a surface of an aluminum substrate having a thickness of 1.5 T two kinds of pulse lasers under the condition represented in Table 7 below so that the pulse lasers are orthogonal to each other. In this case, etching grooves and burrs generated during the etching were connected with each other along peripheral portions of the etching grooves to be formed in a shape of a fence having an internal space.

Subsequently, the patterned aluminum substrate faced a polypropylene resin substrate having a thickness of 3.2 T and then the aluminum substrate was irradiated with a laser having a spot size of 660 μm with an output of 350 W at a wavelength of 1,064 nm in a state where the aluminum substrate headed in an upper direction, and in this case, the polypropylene resin was melted by repeatedly scanning the laser five times at a scanning speed of 20 mm/s, thereby manufacturing a joint body of different materials.

A depth of the etching groove, a width of an entrance of the etching groove, a ratio (aspect ratio) of the depth of the etching groove and the width of the entrance of the etching groove, a length of the burr, and joining force (shearing tensile strength) of the joint body of different materials manufactured as described above were measured by the foregoing method, and a result of the measurement is represented in Table 8 below.

TABLE 7

|  | Output (W) | Frequency (kHz) | scanning speeds (mm/s) | Number of times of emission (times) |
|---|---|---|---|---|
| Reference Example 2 | 30 | 70 | 200 | 4 |
| Reference Example 3 | 30 | 70 | 100 | 4 |
| Reference Example 4 | 30 | 40 | 200 | 4 |
| Example 3 | 50 | 70 | 200 | 4 |

TABLE 8

|  | Depth of etching groove (μm) | width of entrance of etching groove (μm) | Aspect ratio | Length of burr (μm) | Height of burr (μm) | Angle of burr (°) | Joining force (Mpa) |
|---|---|---|---|---|---|---|---|
| Reference Example 2 | 170 | 13.5 | 12.59 | 30 | 30 to 40 | 70 to 90 | 7.05 |
| Reference Example 3 | 182 | 14 | 13 | 30 | 30 to 40 | 80 to 90 | 6.59 |
| Reference Example 4 | 207 | 17 | 12.2 | 35 | 40 to 60 | 90 | 7.06 |
| Example 3 | 300 | 15 | 13.33 | 70 | 70 to 80 | 40 to 60 | 10.14 |

* Angle of burr: Angle of the burr with respect to the surface of the metal layer Further, images of lateral surfaces of Example 3 and Reference Examples 2 to 4 photographed by an SEM are illustrated in FIGS. 7A to 7D, respectively.

According to the results of Table 8 and FIG. 7, it can be confirmed that the joining force of Example 3 is larger, by about 3 MPa, than the joining force of Reference Examples in which the length of the burr is small and the angle of the burr with respect to the surface of the metal layer is relatively close to an obtuse angle.

Accordingly, it can be confirmed that even though the depth of the etching groove and the width of the entrance of the etching groove are in the similar ranges, when the length of the burr is large and the angle of the burr with respect to the surface of the metal layer is small, particularly, an acute angle of 40° to 60°, the joining force is large.

[Relation Between Length of Burr and Joining Force and Air Tightness of Joint Body of Different Materials]

Examples 6 and 7 and Comparative Example 5 a surface of an aluminum substrate having a thickness of 1.5 T was irradiated with a pulse laser having a focal size of about 35 μm with an output of 35 W at a wavelength of 1,064 nm under a condition of a speed of 200 mm/s and a frequency of 50 kHz, and the aluminum substrate was etched so as to have the depth of the etching groove, the height of the burr, the length of the burr, and the etching interval represented in Table 9 below.

Further, a polyphenylene oxide resin including glass fiber by 40 weight % was joined to the etched metal substrate by insert molding, thereby manufacturing a joint body of different materials.

Joining force (shearing tensile strength) of the etching groove of the joint body of different materials manufactured as described above was measured by the foregoing method, and a result of the measurement is represented in Table 10 below.

Further, air tightness of the joint body of different materials was tested for 30 seconds under a pneumatic condition of 30.52 PSIG (2 bars) after joining the different materials, and when a pressure loss is equal to or smaller than 0.057 PSIG, air tightness was determined as pass, and when a pressure loss is larger than 0.057 PSIG, air tightness was determined as fail, and a result of the measurement is represented in Table 10 below.

TABLE 9

|  | Depth of etching groove (μm) | Height of burr (μm) | Length of burr (μm) | Etching interval (μm) |
|---|---|---|---|---|
| Example 6 | 100 to 110 | 50 to 60 | 35 to 45 | 200 |
| Example 7 | 120 to 130 | 50 to 60 | 35 to 45 | 250 |
| Comparative Example 5 | 160 to 170 | 1 to 9 | 5 to 15 | 250 |

TABLE 10

|  | Joining force (Mpa) | Air tightness |
|---|---|---|
| Example 6 | 20 | Pass |
| Example 7 | 18 | Pass |
| Comparative Example 5 | 6 | Fail |

According to Tables 9 and 10, it can be confirmed that the joining force of Comparative Example 5 in which the length of the burr is smaller than those of Examples 6 and 7 is considerably degraded, and the air tightness is not secured in Comparative Example 5.

Further, it can be confirmed that when the depth of the etching groove is large, but the height of the burr fails to satisfy the range according to the exemplary embodiment of the present invention, the joining force and the air tightness are not secured.

The invention claimed is:

1. A joint body of different materials, comprising:
a metal layer; and
a resin layer provided on and in contact with one surface of the metal layer,
wherein the metal layer comprises two or more etching grooves and two or more burrs provided on a surface of the metal layer adjacent to the etching grooves,
wherein each of the two or more burrs form an acute angle with respect to the surface of the metal layer,
wherein the resin layer is fixed to the metal layer by filling an interior of each of the two or more etching grooves, the surface of the metal layer, and a space between the two or more burrs with the resin layer,
wherein a ratio of a depth of each of the two or more etching grooves to a width of an entrance of each of the two or more etching grooves is 3:1 to 14:1,
wherein the width of the entrance of each of the two or more etching grooves is 10 µm or more and 25 µm or less,
wherein the depth of each of the two or more etching grooves is 50 µm or more and 250 µm or less, and
wherein a ratio of a width of a center of each of the two or more etching grooves to the width of the entrance of each of the two or more etching grooves is 1.3:1 to 3:1.

2. The joint body of different materials of claim 1, wherein each of the two or more etching grooves is surrounded by the two or more burrs extending in a distal direction of the etching groove, and
an angle between each of the two or more burrs and the surface of the metal layer is 30° or more and 80° or less.

3. The joint body of different materials of claim 1, wherein the width of the center of the etching groove is 15 µm or more and 30 µm or less.

4. The joint body of different materials of claim 1, wherein a length from one end to an opposite end of each of the two or more burrs is 25 µm or more and 80 µm or less.

5. The joint body of different materials of claim 1, wherein a height of each of the two or more burrs is 30 µm or more and 100 µm or less.

6. The joint body of different materials of claim 1, wherein a distance from one end of an etching groove having the largest depth to an end of another etching groove is 50 µm or more and 1,000 µm or less.

7. A method of manufacturing a joint body of different materials, the method comprising;
etching a metal layer by irradiating a surface of the metal layer with a first laser to form an etched metal layer having two or more etching grooves and two or more burrs the surface of the metal layer; and
forming a resin layer on one surface of the etched metal layer,
wherein each of the two or more burrs form an acute angle with respect to the surface of the metal layer,
wherein the resin layer is fixed to the metal layer by filling an interior of each of the two or more etching grooves, the surface of the metal layer, and a space between the two or more burrs with the resin layer, and
wherein a ratio of a depth of each of the two or more etching grooves to a width of an entrance of each of the two or more etching grooves is 3:1 to 14:1,
wherein the width of the entrance of each of the two or more etching grooves is 10 µm or more and 25 µm or less,
wherein the depth of each of the two or more etching grooves is 50 µm or more and 250 µm or less, and
wherein a ratio of a width of a center of each of the two or more etching grooves to the width of the entrance of each of the two or more etching grooves is 1.3:1 to 3:1.

8. The method of claim 7,
wherein the first laser is a pulse laser having a wavelength of 1,064 nm,
wherein the first laser is irradiated on the metal layer with an output of 20 W or more and 200 W or less, a frequency of 30 kHz or more and 600 kHz or less, and a scanning speed of 100 mm/s or more and 1,000 mm/s or less, a pulse width of 15 ns or more and 220 ns or less, a spot size of 15 µm or more and 50 µm or less, a peak output of 1.5 kW or more and 6 kW or less, and a pulse energy of 0.1 mJ or more and 2 mJ or less, and
wherein the metal layer is irradiated with the first laser 1 or more and 10 or less times.

9. The method of claim 7,
wherein the forming of the resin layer is performed by applying resin to each of the surfaces of the etched metal layer, the two or more etching grooves, and two or more the burrs.

10. The method of claim 7,
wherein the forming of the resin layer is performed by preparing a laminate body of different materials which comprises the resin layer provided on one surface of the etched metal layer, and irradiating the laminate body with a second laser, and
wherein the second laser is irradiated with a wavelength in a near-infrared ray region, an output of 50 W or more and 2,000 W or less, a spot size of 100 µm or more and 5,000 µm or less, and a scanning speed of 10 mm/s or more and 1,000 mm/s or less, and
wherein the laminate body is irradiated with the second layer 1 or more and 50 or less times.

11. The method of claim 10,
wherein the second laser is irradiated in a direction from the resin layer to the metal layer to penetrate the resin layer by focusing on the surface of the metal layer which is in contact with the resin layer.

12. The method of claim 10,
wherein the second laser is irradiated in a direction from the metal layer to the resin layer to join the resin layer to the metal layer by focusing on an opposite surface of the surface of the metal layer which is in contact with the resin layer.

* * * * *